United States Patent
Graham et al.

(10) Patent No.: US 10,107,499 B2
(45) Date of Patent: Oct. 23, 2018

(54) FUEL PLENUM FOR A FUEL NOZZLE AND METHOD OF MAKING SAME

(71) Applicant: General Electric Company, Schenectady, NY (US)

(72) Inventors: Kaitlin Marie Graham, Greenville, SC (US); Jonathan Dwight Berry, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 532 days.

(21) Appl. No.: 14/448,170

(22) Filed: Jul. 31, 2014

(65) Prior Publication Data
US 2016/0033138 A1  Feb. 4, 2016

(51) Int. Cl.
*F23D 17/00* (2006.01)
*F23R 3/36* (2006.01)
*F02C 7/22* (2006.01)
*B23P 19/00* (2006.01)
*F23D 11/36* (2006.01)
(Continued)

(52) U.S. Cl.
CPC ............... *F23R 3/36* (2013.01); *B23P 19/00* (2013.01); *F02C 7/222* (2013.01); *F02C 7/24* (2013.01); *F02C 9/40* (2013.01); *F23D 11/36* (2013.01); *F23D 11/40* (2013.01); *F23D 11/441* (2013.01); *F23D 17/00* (2013.01); *F23D 17/002* (2013.01); *F23R 3/283* (2013.01); *F23R 3/286* (2013.01); *F23R 3/343* (2013.01); *F05D 2230/642* (2013.01); *F05D 2260/20* (2013.01); *F23D 2900/00018* (2013.01)

(58) Field of Classification Search
CPC .. F23R 3/36; F23R 3/283; F23R 3/286; F23R 3/343; B23P 19/00; F02C 7/222; F02C 9/40; F02C 7/24; F05D 2240/642; F05D 2260/20; F05D 2260/231; F23D 11/36; F23D 11/40; F23D 11/441; F23D 17/00; F23D 17/002; F23D 2900/00018
See application file for complete search history.

(56) References Cited

U.S. PATENT DOCUMENTS

| 4,967,561 | A | * | 11/1990 | Bruhwiler | ............... | F23D 23/00 60/39.463 |
| 5,263,325 | A | * | 11/1993 | McVey | ..................... | F23R 3/34 60/39.826 |

(Continued)

FOREIGN PATENT DOCUMENTS

| EP | 2385299 A2 | 11/2011 |
| WO | 2013115671 A1 | 8/2013 |

*Primary Examiner* — Gerald L Sung
*Assistant Examiner* — Marc Amar
(74) *Attorney, Agent, or Firm* — Armstrong Teasdale LLP

(57) ABSTRACT

A fuel plenum for a fuel nozzle assembly includes a gaseous fuel conduit, a conduit passage, and a liquid fuel conduit. Said gaseous fuel conduit received at a first end of said fuel plenum. Said fuel plenum is configured to distribute gaseous fuel received from said gaseous fuel conduit. Said conduit passage extends from the first end to a second end of said fuel plenum. Said conduit passage is at least partially defined by at least one interior wall of said fuel plenum. Said liquid fuel conduit defined by an outer wall and a portion of said liquid fuel conduit extending through said conduit passage. Said liquid fuel conduit outer wall is offset from said at least one interior wall.

10 Claims, 4 Drawing Sheets

(51) Int. Cl.
*F23D 11/40* (2006.01)
*F23D 11/44* (2006.01)
*F23R 3/28* (2006.01)
*F02C 7/24* (2006.01)
*F23R 3/34* (2006.01)
*F02C 9/40* (2006.01)

(56) References Cited

U.S. PATENT DOCUMENTS

| | | | | |
|---|---|---|---|---|
| 5,833,141 A | * | 11/1998 | Bechtel, II | F23D 17/002 |
| | | | | 239/406 |
| 2006/0266046 A1 | * | 11/2006 | Bonzani | F23D 17/00 |
| | | | | 60/746 |
| 2013/0167539 A1 | * | 7/2013 | Berry | F23R 3/286 |
| | | | | 60/737 |
| 2014/0083102 A1 | * | 3/2014 | Miura | F23R 3/286 |
| | | | | 60/737 |
| 2014/0190168 A1 | * | 7/2014 | Shershnyov | F23R 3/283 |
| | | | | 60/737 |

* cited by examiner

FUEL PLENUM FOR A FUEL NOZZLE AND METHOD OF MAKING SAME

BACKGROUND

The embodiments described herein relate generally to a fuel nozzle assembly for a combustor and, more particularly, to methods and systems for thermally compliant fuel nozzle assemblies.

At least some known fuel nozzle assemblies for combustors, such as combustors for gas turbines, include circuits for gases and circuits for liquids. In at least some known fuel nozzle assemblies, a liquid fuel conduit is at least partially enclosed in a conduit of a gas circuit, due, for example, to space limitations for the fuel nozzle assembly. The gas circuit, which may include a gaseous fuel plenum, may reach high temperatures relative to the liquid in the liquid circuit. Thus, the fuel circuits within at least some known fuel nozzle assemblies may be subjected to significant thermal differences.

Such thermal differences in the fuel nozzle assembly may increase differential thermal expansion and produce undesirable thermal strains. In addition, such thermal differences tend to cause a temperature of each fluid to move out of a respective desired temperature range. For example, a liquid within the liquid circuit must be maintained below a threshold temperature in order to maintain its state as a liquid.

BRIEF DESCRIPTION

In one aspect, a fuel plenum for a fuel nozzle assembly is provided. The fuel plenum includes a gaseous fuel conduit, a conduit passage, and a liquid fuel conduit. The gaseous fuel conduit is received at a first end of said fuel plenum. The fuel plenum is configured to distribute gaseous fuel received from said gaseous fuel conduit. The conduit passage extends from the first end to a second of the fuel plenum. The conduit passage is at least partially defined by at least one interior wall of the fuel plenum. The liquid fuel conduit is defined by an outer wall and a portion of the liquid fuel conduit extends through the conduit passage. The liquid fuel conduit outer wall is offset from the at least one interior wall.

In another aspect, a fuel nozzle assembly is provided having a liquid fuel conduit, a gaseous fuel conduit, and a fuel plenum. The liquid fuel conduit is defined by an outer wall. The fuel plenum is configured to receive each of a first portion of the liquid fuel conduit and the gaseous fuel conduit. The fuel plenum includes a plurality of chambers and a conduit passage. Each chamber of the plurality of chambers of the fuel plenum is in flow communication with the gaseous fuel conduit. The conduit passage extends from a first end to a second end of the fuel plenum and is at least partially defined by at least one interior wall of the fuel plenum where a second portion of the liquid fuel conduit extends through the conduit passage. The liquid fuel conduit outer wall is offset from the at least one interior wall.

In yet another aspect, a method for making a fuel nozzle assembly is provided. The method includes extending a portion of a liquid fuel conduit through a conduit passage of a fuel plenum. The method further includes offsetting an outer wall of the liquid fuel conduit from at least one interior wall of the fuel plenum. The conduit passage extends from a first end to a second end of the fuel plenum and is at least partially defined by the at least one interior wall and the liquid fuel conduit is defined by the outer wall.

DETAILED DESCRIPTION

The exemplary methods and systems described herein overcome at least some of the disadvantages associated with known fuel nozzle assemblies. The embodiments described herein include a liquid fuel conduit defined by an outer wall that is offset from an outer wall defining a gaseous fuel conduit, and/or offset from an interior wall of a fuel plenum. Moreover, the embodiments described herein also include the liquid fuel conduit coupled to the fuel nozzle assembly proximate to the fuel plenum, such that structural constraints on thermal expansion of the liquid fuel conduit, relative to a face of the fuel nozzle assembly and/or to the fuel plenum, are decreased.

Figure 1:
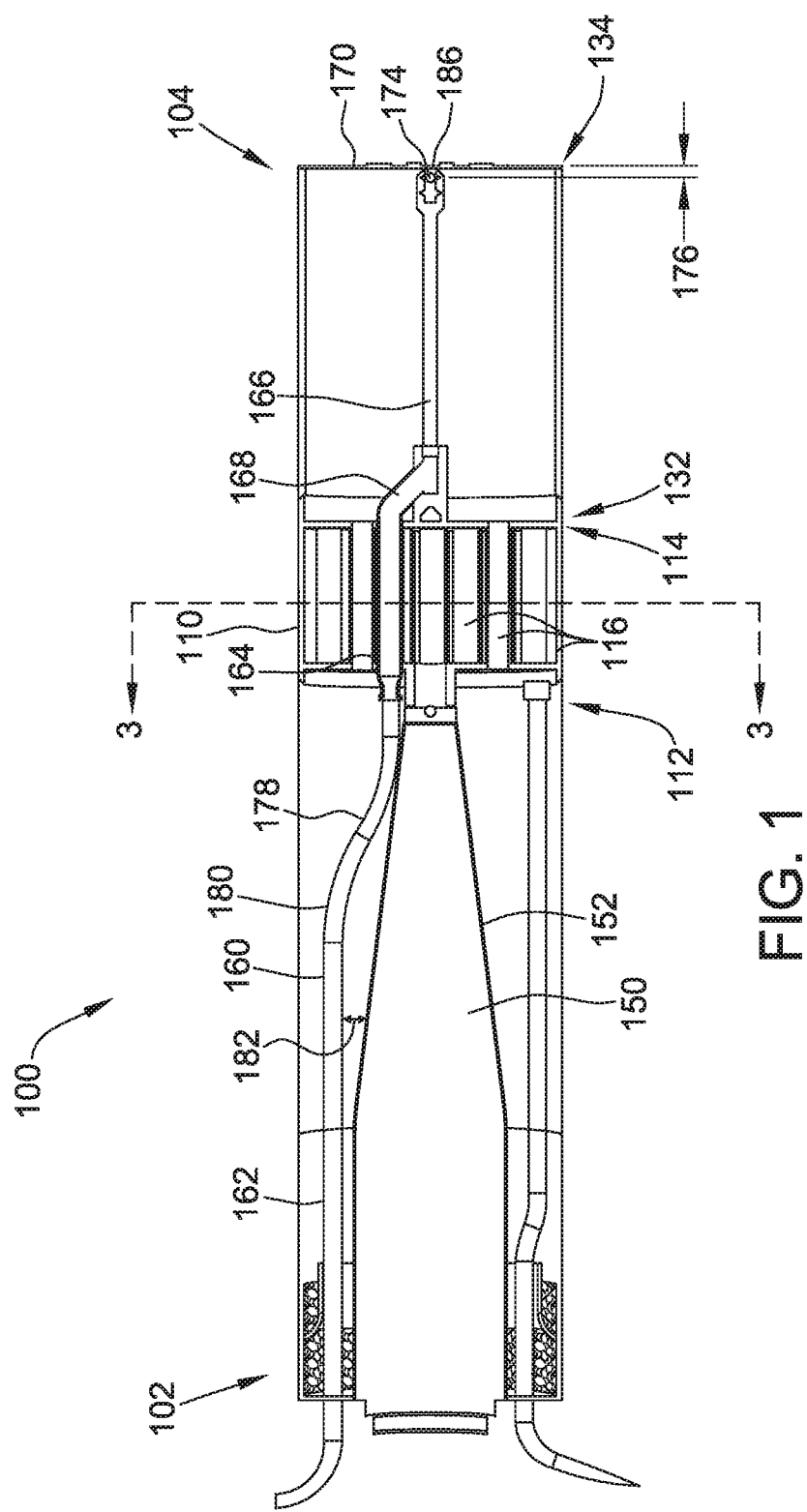
FIG. 1 is a schematic cross-sectional view of an exemplary fuel nozzle assembly.

FIG. 1 is a schematic view of an exemplary fuel nozzle assembly 100. Fuel nozzle assembly 100 may be used, for example, with a combustor for a gas turbine (not shown). Fuel nozzle assembly 100 extends axially from a first, or forward, end 102 to a second, or aft, end 104. In the exemplary embodiment, fuel nozzle assembly 100 has a generally circular cross-sectional shape. In alternative embodiments, fuel nozzle assembly 100 has any suitable cross-sectional shape.

A fuel plenum 110 is disposed within fuel nozzle assembly 100. Fuel plenum 110 extends axially from a first, or forward, end 112 to a second, or aft, end 114. A gaseous fuel conduit 150, defined at least partially by an outer wall 152, is configured to supply gaseous fuel to fuel plenum 110. Fuel plenum 110 is coupled to gaseous fuel conduit 150 at first end 112, and is configured to distribute gaseous fuel received from gaseous fuel conduit 150 to a plurality of chambers 116 defined in fuel plenum 110. In some embodiments, chambers 116 are in flow communication with a plurality of mixing tubes (not shown). For example, the mixing tubes may extend axially from a first, or forward, end 132, proximate to fuel plenum 110, to a second, or aft, end 134, proximate fuel nozzle assembly aft end 104. The mixing tubes and, optionally, chambers 116 are configured to mix the gaseous fuel with a supply of air (not shown), for example, compressed air supplied from a compressor. In operation, the mixture of gaseous fuel and air exits the mixing tubes through an aft face plate 170 coupled to aft end 104 of fuel nozzle assembly 100.

A liquid fuel conduit 160 is configured to supply liquid fuel to fuel nozzle assembly 100. In operation, a temperature of the liquid fuel is relatively cool compared to a temperature of the relatively hot gaseous fuel supplied by gaseous fuel conduit 150. In the exemplary embodiment, a first portion 162 of liquid fuel conduit 160 extends generally axially from proximate first end 102 of fuel nozzle assembly 100 to first end 112 of fuel plenum 110, a second portion 164 of liquid fuel conduit 160 extends generally axially from first end 112 of fuel plenum 110 to second end 114 of fuel plenum 110, and a third portion 166 of liquid fuel conduit 160 extends generally axially from a first end, proximate second end 114 of fuel plenum 110, to a second end, proximate aft end 104 of fuel nozzle assembly 100. Third portion 166 terminates proximate aft end 104 in a pilot tip 174. In the exemplary embodiment, second portion 164 and third portion 166 are coupled in flow communication at a joint 168.

In the exemplary embodiment, third portion 166 of liquid fuel conduit 160 is structurally coupled to fuel nozzle assembly 100 at a single location proximate fuel plenum 110, such that an end of third portion 166 opposite the single location is configured to thermally expand and contract axially without substantial structural constraint during operation. For example, in the exemplary embodiment, third portion 166 is structurally coupled to fuel nozzle assembly 100 at joint 168, and an opposite end of third portion 166 proximate pilot tip 174 is unconstrained axially, such that pilot tip 174 moves toward and away from aft face plate 170 without substantial constraint as third portion 166 thermally expands and contracts axially, respectively, from joint 168. In the exemplary embodiment, a gap 176 is provided between pilot tip 174 and aft face plate 170, and gap 176 is sized to accommodate such thermal expansion and contraction of third portion 166. In alternative embodiments, third portion 166 is structurally coupled to fuel nozzle assembly 100 at alternative or additional locations.

Similarly, in the exemplary embodiment, second portion 164 is structurally coupled to fuel nozzle assembly 100 at a single location proximate fuel plenum 110, such that an end of second portion 164 opposite the single location is configured to thermally expand and contract axially without substantial structural constraint during operation. For example, in the exemplary embodiment, second portion 164 is structurally coupled to fuel nozzle assembly 100 at joint 168, and an opposite end of second portion 164, proximate fuel plenum first end 112, is axially constrained only by an axial stiffness of first portion 162. First portion 162 is configured to have a relatively insubstantial axial stiffness, such that the end of second portion 164 opposite joint 168 moves toward and away from forward end 102 without substantial structural constraint as second portion 164 thermally expands and contracts axially, respectively, from joint 168. For example, in the exemplary embodiment, first portion 162 includes at least one flexed portion 178, and the at least one flexed portion 178 reduces the axial stiffness of first portion 162. In alternative embodiments, second portion 164 is structurally coupled to fuel nozzle assembly 100 at alternative or additional locations.

In addition, a pilot opening 186 is defined aft face plate 170 proximate pilot tip 174. Pilot opening 186 is configured to be in flow communication with third portion 166 of liquid fuel conduit 160 (shown in FIG. 1) when aft face plate 170 is coupled to aft end 104 of fuel nozzle assembly 100. In an embodiment (not shown), third portion 166 of liquid fuel conduit 160 is a plurality of third portions 166 each configured to be in flow communication with a corresponding pilot opening 186 defined in aft face plate 170 when aft face plate 170 is coupled to aft end 104 of fuel nozzle assembly 100, and a shape of each pilot opening 186 at least partially corresponds to a cross-sectional shape of the corresponding third portion 166.

Liquid fuel conduit 160 is defined by an outer wall 180. In the exemplary embodiment, liquid fuel conduit outer wall 180 is offset from outer wall 152 of gaseous fuel conduit 150. Thus, first portion 162 of liquid fuel conduit 160 is not circumscribed by gaseous fuel conduit 150 and, in operation, is not in substantial contact with hot gas in any portion of gaseous fuel conduit 150. In the exemplary embodiment, liquid fuel conduit outer wall 180 is offset by a first distance 182 from outer wall 152 of gaseous fuel conduit 150, and first distance 182 varies axially along first portion 162, such that liquid fuel conduit outer wall 180 approaches, but does not contact, gaseous fuel conduit outer wall 152. It should be understood, however, for purposes of this disclosure, that liquid fuel conduit outer wall 180 also is offset from gaseous fuel conduit outer wall 152 in embodiments in which liquid fuel conduit outer wall 180 contacts gaseous fuel conduit outer wall 152 over a portion of first portion 162 that is relatively short compared to its total length. In one such embodiment (not shown), liquid fuel conduit outer wall 180 contacts gaseous fuel conduit outer wall 152 over less than approximately 15 percent of the total length of first portion 162. In another such embodiment (not shown), liquid fuel conduit outer wall 180 contacts gaseous fuel conduit outer wall 152 over less than approximately 5 percent of the total length of first portion 162. It also should be understood that the described contact of liquid fuel conduit outer wall 180 and gaseous fuel conduit outer wall 152 may be divided over a plurality of contact locations.

In an embodiment (not shown), first portion 162 is a plurality of first portions 162 each defined by a corresponding outer wall 180, and each outer wall 180 is offset from gaseous fuel conduit outer wall 152, such as by a corresponding first distance 182.

Figure 2:
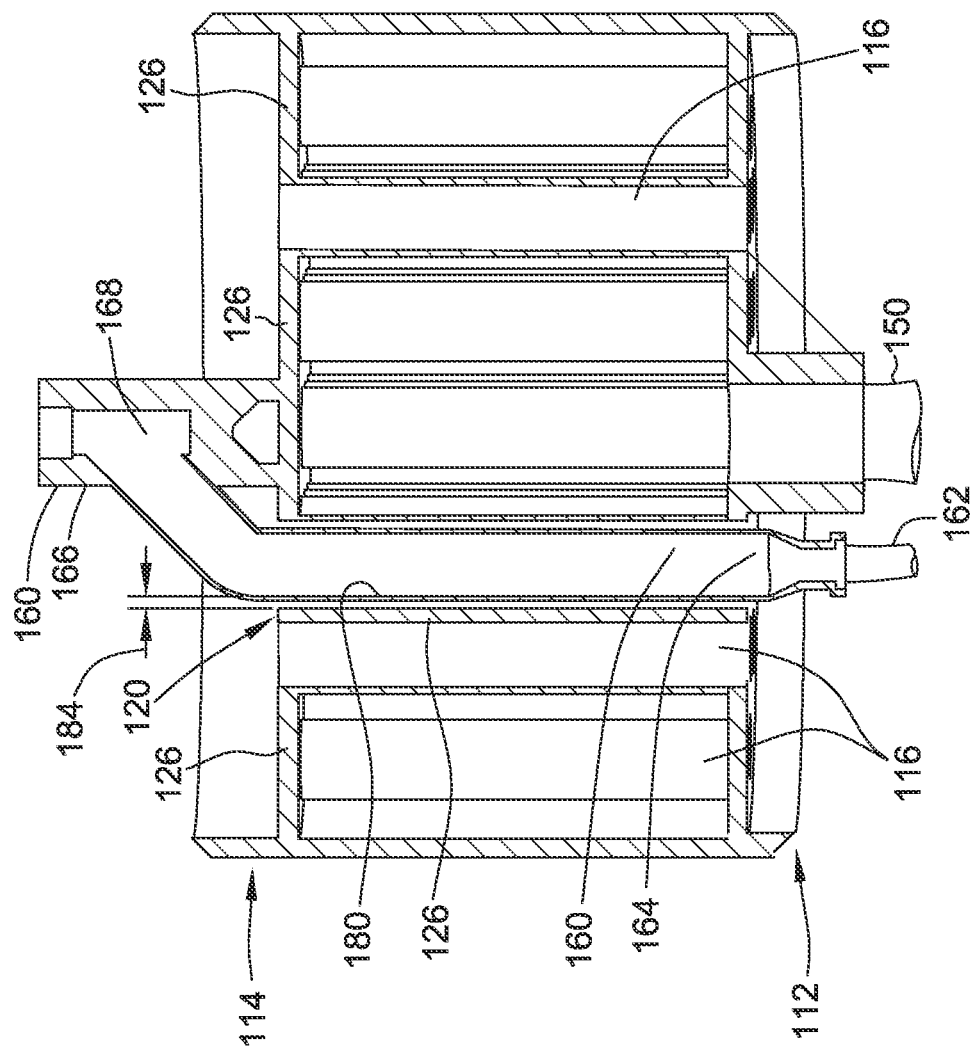
FIG. 2 is a schematic cross-sectional view of an exemplary fuel plenum that can be used in the fuel nozzle assembly shown in FIG. 1.

FIG. 2 is a schematic cross-sectional view of fuel plenum 110. Each of first portion 162 of liquid fuel conduit 160 and gaseous fuel conduit 150 is received at first end 112 of fuel plenum 110. In the exemplary embodiment, a plurality of chambers 116 is defined in fuel plenum 110, as described above. More specifically, each chamber 116 of the plurality of chambers 116 is at least partially defined by at least one interior wall 126 of fuel plenum 110. Each chamber 116 is in flow communication with gaseous fuel conduit 150 via at least one aperture (not shown) defined in the corresponding at least one interior wall 126. More specifically, the apertures are in flow communication with gaseous fuel conduit 150 via passages (not shown) defined in the interior walls 126.

A conduit passage 120 also is defined in fuel plenum 110. More specifically, conduit passage 120 is at least partially defined by at least one interior wall 126 of fuel plenum 110. Conduit passage 120 extends between first end 112 and second end 114 of fuel plenum 110. In the exemplary embodiment, conduit passage 120 does not include any apertures, such that conduit passage 120 is not in flow communication with gaseous fuel conduit 150. In alternative embodiments, at least one aperture is defined in the at least one interior wall 126 that defines conduit passage 120.

In certain embodiments, conduit passage 120 is formed within fuel plenum 110 by an additive manufacturing process, in which fuel plenum 110 is formed in successive thin layers from, for example, first end 112 to second end 114. In a particular embodiment, fuel plenum 110 is formed from the additive manufacturing process referred to as direct metal laser melting, in which each of a plurality of very thin layers of metal powder is successively melted on top of the previous layer. The internal geometry of chambers 116 and conduit passage 120 can be controlled by arranging the powder on a layer-by-layer basis, enabling complex internal geometries of fuel plenum 110 to be formed. In an alternative embodiment, fuel plenum 110 is initially formed as a block, and conduit passage 120 and/or chambers 116 are machined into the block. In other alternative embodiments, fuel plenum 110 is formed using any suitable method that enables liquid fuel conduit 160 to function as described herein.

Second portion 164 of liquid fuel conduit 160 extends through conduit passage 120. Outer wall 180 of second portion 164 is offset from the at least one interior wall 126 that defines conduit passage 120. Thus, second portion 164 of liquid fuel conduit 160 is not in substantial contact with the interior walls 126 of fuel plenum 110, such that in operation, heat transfer from the relatively hot interior walls of fuel plenum 110 to the liquid flow through liquid fuel conduit 160 is reduced. In the exemplary embodiment, liquid fuel conduit outer wall 180 is offset by a second distance 184 from the at least one interior wall 126 that defines conduit passage 120. In the exemplary embodiment, second distance 184 is substantially constant axially along second portion 164. In an alternative embodiment, second distance 184 varies axially along second portion 164, such that liquid fuel conduit outer wall 180 approaches, but does not contact, the at least one interior wall 126 that defines conduit passage 120. It should be understood, however, for purposes of this disclosure, that liquid fuel conduit outer wall 180 also is offset from the at least one interior wall 126 that defines conduit passage 120 in embodiments in which liquid fuel conduit outer wall 180 contacts the at least one interior wall 126 that defines conduit passage 120 over a portion of second portion 164 that is relatively short compared to its total length, as described above for first portion 162 and gaseous fuel conduit outer wall 152.

Figure 3:
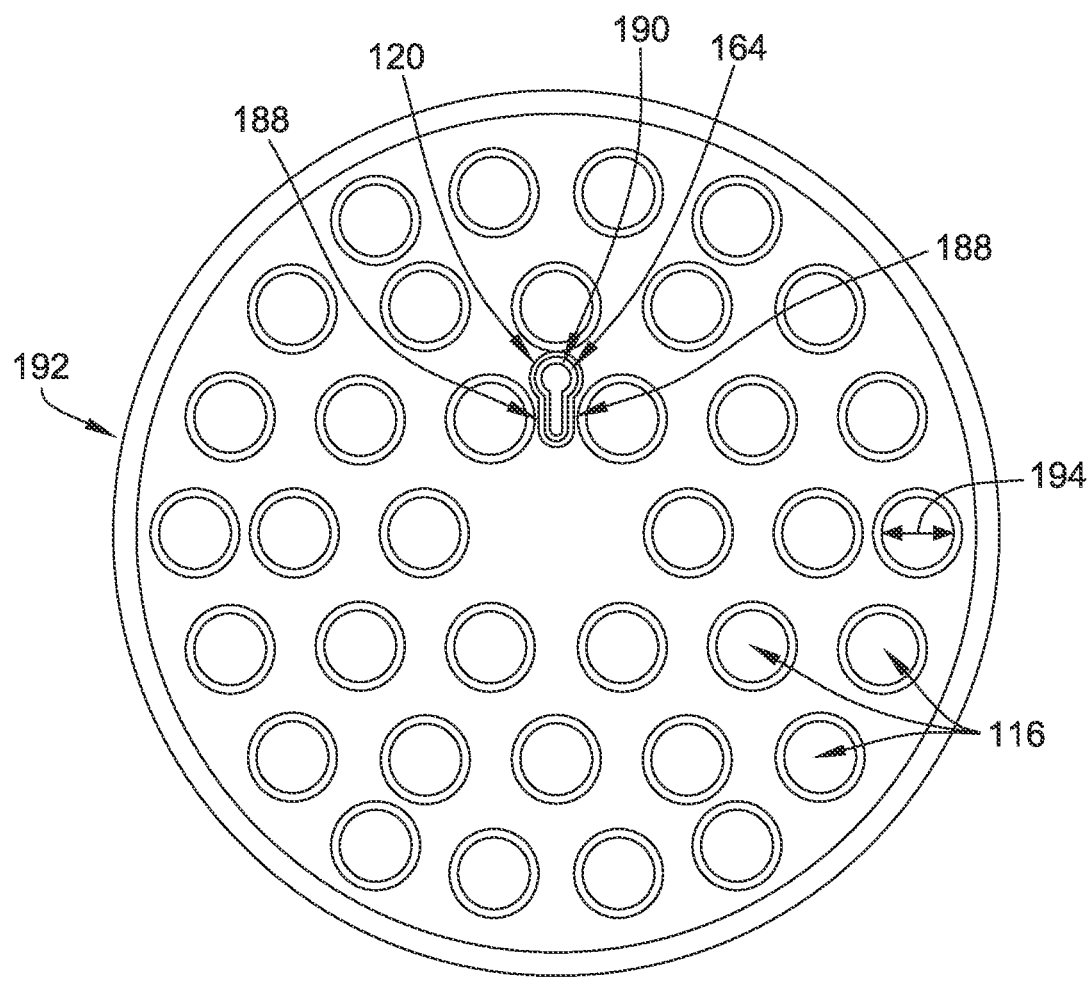
FIG. 3 is a cross-sectional view of the fuel plenum shown in FIG. 2 that may be used with the fuel nozzle assembly shown in FIG. 1.

FIG. 3 is a cross-sectional view of fuel plenum 110 taken along line 3-3 shown in FIG. 1. Chambers 116 are arranged in a pattern 192. Each chamber 116 is generally circular and has a diameter 194, and diameter 194 varies among at least some of the chambers 116. In alternative embodiments, each chamber 116 has any suitable size and shape, and pattern 192 is any pattern, that enables fuel nozzle assembly 100 to function as described herein. In some embodiments, at least one of pattern 192 and the size and shape of each chamber 116 is predetermined to satisfy design criteria, and a cross-sectional shape of conduit passage 120, through which second portion 164 of liquid fuel conduit 160 passes, is selected to fit within the predetermined arrangement of chambers 116. For example, the predetermined arrangement of chambers 116 is selected to facilitate at least one of a desired amount of mixing of the gaseous fuel and air, a desired flow coupling to mixing tubes, and a desired injection pattern from fuel nozzle assembly 100 into a combustor (not shown). In the illustrated embodiment, the shape of conduit passage 120 is keyhole-shaped, with a narrow portion 188 of the keyhole shape disposed between two adjacent chambers 116 and a wider portion 190 of the keyhole shape disposed in an area bounded by three adjacent chambers 116. In alternative embodiments, conduit passage 120 has any suitable size and shape that enables fuel nozzle assembly 100 to function as described herein.

Figure 4:
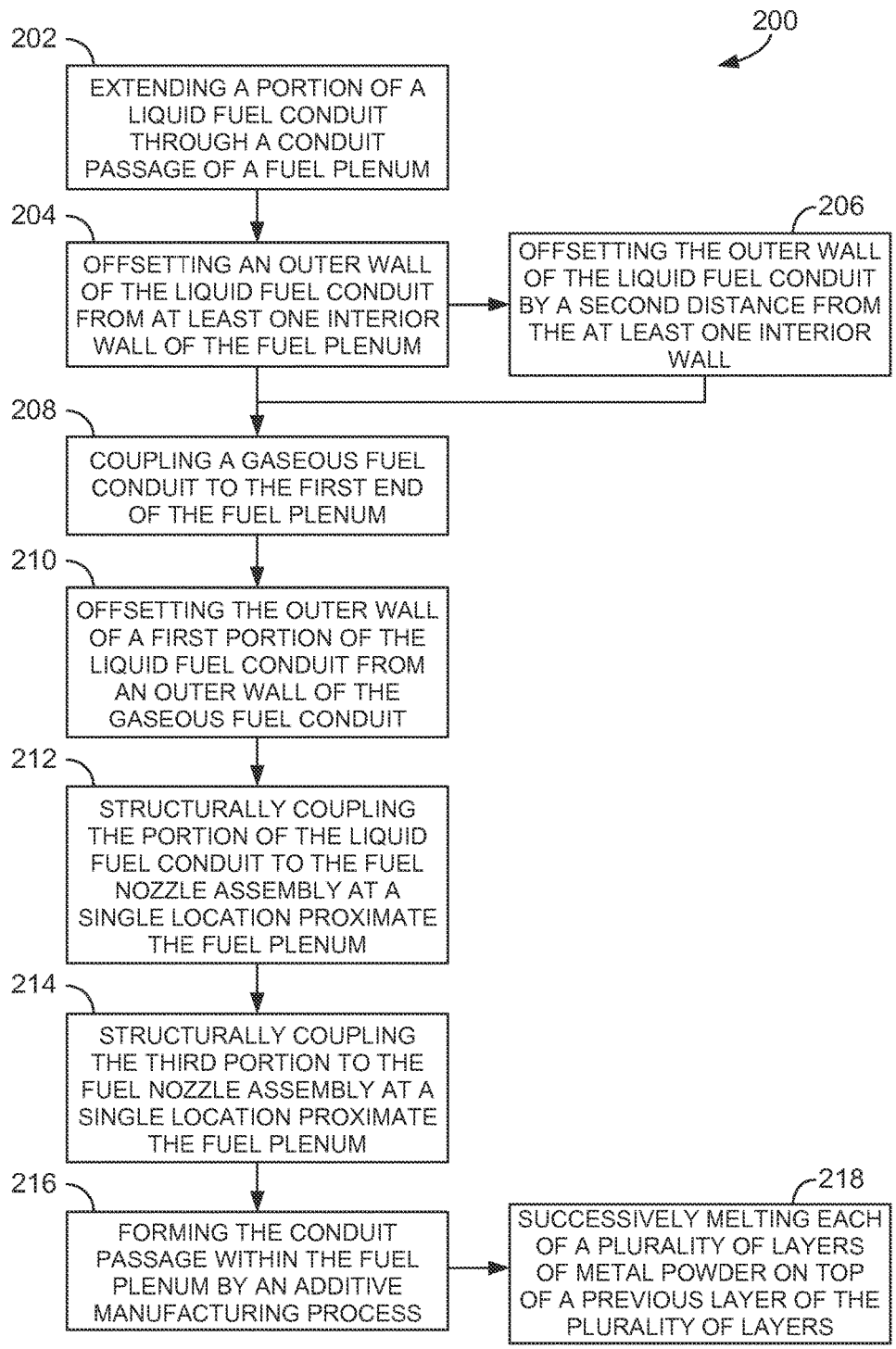
FIG. 4 is a flow chart of an exemplary method of making a fuel nozzle assembly, such as the fuel nozzle assembly shown in FIG. 1.

An exemplary method 200 of making a fuel nozzle assembly, such as fuel nozzle assembly 100, is illustrated in FIG. 4. With reference also to FIGS. 1-3, method 200 includes extending 202 a portion, such as second portion 164, of a liquid fuel conduit, such as liquid fuel conduit 160, through a conduit passage, such as conduit passage 120, of a fuel plenum, such as fuel plenum 110. Method 200 also includes offsetting 204 an outer wall, such as outer wall 180, of the liquid fuel conduit from at least one interior wall of the fuel plenum, such as at least one interior wall 126. The conduit passage extends from a first end, such as first end 112, to a second end, such as second end 114, of the fuel plenum and is at least partially defined by the at least one interior wall. The liquid fuel conduit is defined by the outer wall.

In certain embodiments of method 200, the step of offsetting 204 the outer wall of the liquid fuel conduit from at least one interior wall of the fuel plenum includes offsetting 206 the outer wall by a second distance, such as second distance 184, from the at least one interior wall.

In certain embodiments of method 200, the portion of the liquid fuel conduit extended through the conduit passage is a second portion of the liquid fuel conduit, and method 200 further includes coupling 208 a gaseous fuel conduit, such as gaseous fuel conduit 150, to the first end of the fuel plenum, and offsetting 210 the outer wall of a first portion, such as first portion 162, of the liquid fuel conduit from an outer wall, such as outer wall 152, of the gaseous fuel conduit. The first portion is received at the first end of the fuel plenum.

In some embodiments, method 200 also includes structurally coupling 212 the portion of the liquid fuel conduit to the fuel nozzle assembly at a single location, such as at joint 168, proximate the fuel plenum, such that an end of the portion opposite the single location is configured to thermally expand and contract axially without substantial structural constraint.

In certain embodiments, a third portion, such as third portion 166, of the liquid fuel conduit extends generally axially from a first end proximate the fuel plenum to a second end proximate an aft end, such as aft end 104, of the fuel nozzle assembly, and method 200 includes structurally coupling 214 the third portion to the fuel nozzle assembly at a single location, such as at joint 168, proximate the fuel plenum, such that the second end of the third portion is configured to thermally expand and contract axially without substantial structural constraint.

In some embodiments, method 200 includes forming 216 the conduit passage within the fuel plenum by an additive manufacturing process. In a particular embodiment, the step of forming 216 the conduit passage within the fuel plenum includes successively melting 218 each of a plurality of layers of metal powder on top of a previous layer of the plurality of layers.

Exemplary embodiments of a liquid fuel conduit for a fuel nozzle assembly are described above in detail. The embodiments provide an advantage in reducing heat transfer to a liquid fuel circuit of the fuel nozzle assembly. For example, an outer wall of the liquid fuel conduit may be offset from an outer wall defining a gaseous fuel conduit, and/or offset from an interior wall of a fuel plenum, to facilitate thermal isolation of the liquid fuel. The embodiments also provide an advantage in reducing thermal strains within the fuel nozzle assembly. For example, the liquid fuel conduit may be coupled to the fuel nozzle assembly proximate to the fuel plenum such that structural constraints on thermal expansion of the liquid fuel conduit are decreased.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other assemblies and methods.

While the disclosure has been described in terms of various specific embodiments, those skilled in the art will recognize that the disclosure can be practiced with modification within the spirit and scope of the claims. Although specific features of various embodiments of the disclosure may be shown in some drawings and not in others, this is for convenience only. Moreover, references to "one embodiment" in the above description are not intended to be interpreted as excluding the existence of additional embodiments that also incorporate the recited features. In accordance with the principles of the disclosure, any feature of a drawing may be referenced and/or claimed in combination with any feature of any other drawing.

What is claimed:

1. A fuel nozzle assembly comprising:
a gaseous fuel conduit circumferentially surrounding an axial centerline of said fuel nozzle assembly;
a liquid fuel conduit comprising an upstream section, a middle section, and a downstream section in serial flow communication, each of said upstream, middle, and downstream sections extending axially, wherein said upstream section is at a first radial distance from said centerline, said middle section is at a second radial distance from said centerline, and said downstream section is at a third radial distance from said centerline, and wherein the first, second, and third distances are different from each other; and
a fuel plenum comprising an upstream end, a downstream end, and a plurality of chambers extending between said upstream and downstream ends, said chambers being in flow communication with said gaseous fuel conduit, said middle section of said liquid fuel conduit extending through said fuel plenum from said upstream end to said downstream end.

2. The fuel nozzle assembly of claim 1, wherein said portion upstream section of said liquid fuel conduit is spaced apart from said gaseous fuel conduit.

3. The fuel nozzle assembly of claim 1, wherein a downstream end of said middle section of said liquid fuel conduit is axially constrained at only a single location proximate said downstream end of said fuel plenum, such that said middle section is configured to thermally expand and contract axially without substantial structural constraint.

4. The fuel nozzle assembly of claim 3, wherein said single location is a joint downstream from said downstream end of said fuel plenum.

5. The fuel nozzle assembly of claim 1, wherein the third radial distance is zero.

6. The fuel nozzle assembly of claim 1, wherein said downstream section of said liquid fuel conduit is axially constrained at only a single location proximate said downstream end of said fuel plenum, such that said downstream section is configured to thermally expand and contract axially without substantial structural constraint.

7. The fuel nozzle assembly of claim 6, wherein said single location is a joint downstream from said downstream end of said fuel plenum.

8. The fuel nozzle assembly of claim 7, wherein the second distance is greater than the third distance.

9. The fuel nozzle assembly of claim 1, further comprising an aft face plate coupled to an aft end of said fuel nozzle assembly, said aft face plate defining a pilot opening, said pilot opening being in serial flow communication with said downstream section of said liquid fuel conduit via a pilot tip.

10. The fuel nozzle assembly of claim 1, wherein the first distance is greater than the second distance.

* * * * *